Patented Feb. 6, 1951

2,540,438

UNITED STATES PATENT OFFICE 2,540,438

DEMULSIFIER COMPOSITION

Fritz E. Fuchs, Houston, Tex., assignor to Aquanox Corporation, Houston, Tex., a corporation of Texas No Drawing. Application October 2, 1948, Serial No. 52,589

6 Claims. (Cl. 252—333)

This invention relates to the treatment of emulsions of mineral oil and water, such as petroleum emulsions, for the purpose of separating the oil from the water.

An object of this invention is to provide an improved process for breaking or separating petroleum emulsions by subjecting such emulsions to the action of a novel demulsifying composition to be described in greater detail hereinafter.

Another object is the provision of an improved demulsifier which is highly effective for breaking or separating petroleum emulsions.

Generally stated, the new demulsifier in accordance with this invention comprises a physical mixture composed of petroleum sulfonate soaps, a castor oil-modified alkyd resin, and a compound comprising a polyoxyalkylene derivative of a hexahydric body which has been partially esterified with a long-chain fatty acid.

The petroleum sulfonate soaps employed in the demulsifier may be either the oil-soluble mahogany soaps or the water-soluble green acid soaps or mixtures of both. Both these types are well known, commercially available materials which are derived from petroleum distillates during conventional treatment thereof with sulfuric acid, the soaps being most often prepared in the form of the ammonium, sodium or potassium salts of the acids. In the composition in accordance with this invention, the oil soluble mahogany soaps employed are preferably the sodium soaps ranging in molecular weight from about 250–500 and preferably those of about 425 molecular weight. The water-soluble green acid soaps employed are preferably the ammonium soaps ranging in molecular weight from about 250–450 and preferably those about 300–350 molecular weight. Both types of soaps are readily miscible with the other components of the emulsifying composition contemplated by this invention.

The alkyd resins employed in the compositions in accordance with this invention consists of those which have been modified with castor oil. The alkyd resin may be any one of the numerous and well-known polybasic acid-polyhydric alcohol condensation products. These include condensation products in which the acidic component may comprise such acids and anhydrides as phthalic, maleic, succinic, fumaric, etc., and in which the polyhydric alcohol constituents include such materials as glycerol, and the various glycols. In every case, however, the compositions in accordance with this invention employ only the castor-oil-modified compound. Such castor oil-modified alkyd resins are widely available commercially and are sold under numerous trade names. "Glyptal," Nos. 2555 and 2556, for example, manufactured by the General Electric Company, are typical commercial products of the desirable type. These commercial products are the glycerol-phthalic anhydride resins which have been modified with castor oil. In No. 2555 the resin contains 45% by weight of castor oil fatty acids and in No. 2556 the resin contains 38% by weight of castor oil fatty acids. One method of manufacture of such compounds is described in detail in Howell Patent No. 1,098,728, June 2, 1914.

The third primary component of the new composition may be characterized as a polyoxyalkylene derivative of a hexahydric body which has been partially esterified with a long-chain fatty acid. More specifically these materials are derived from the various hexahydric alcohols, such as mannitol, sorbitol, and dulcitol, and their anhydrides, which include the sorbitans, sorbides, mannitans and mannides. These hexahydric alcohols or anhydrides are partially esterified with long-chain fatty acids, such as oleic, palmitic, stearic, lauric, abietic, and naphthenic acids, to provide partial esters having several free hydroxyl groups on the polyhydric body. These free hydroxyls are then further modified by reaction with alkylene oxide to produce a final compound having both free hydroxyl and ether oxygen substituents which provide the compound with desirable surface active hydrophilic characteristics. These materials are commercially available under the trade name of "Tweens" and their physical and chemical characteristics are described in a pamphlet, entitled "Atlas Spans and Atlas Tweens," reissued June, 1945, by the Atlas Powder Company of Wilmington, Delaware.

In addition to the afore-described principal components, a quantity of a suitable thinning agent is usually added. These agents include such materials, as ethyl alcohol, isopropyl alcohol, petroleum naphtha, solvent naphthas derived from coal and wood tar, such as benzol, toluol, xylol and other similar inert hydrocarbon solvents conventionally used for thinning demulsifying compounds.

Also, the final compound may include a suitable agent for neutralizing or saponifying any free acids in the composition. Such agent may include the alkali hydroxides, or the various basic amines, some examples of which are the mono-di-, and tri-ethanolamines and their equivalents.

The compositions in accordance with this invention are manufactured simply by mixing the several ingredients in any suitable order, only enough heat being employed where necessary to assure thorough mixing, as no chemical reaction is sought to be effected between the ingredients. Generally, a temperature of about 150° F. will be sufficient for this purpose. About 2% by weight of 27° Bé. ammonia may be added, if necessary or desirable, to neutralize any free acidity in the compositions. After the compositions have been made, a quantity of one of the thinners mentioned above may be added to thin the composition to the final desired consistency.

The proportions of the several ingredients in the compositions of this invention may be varied rather widely in accordance with the nature of the emulsions to be treated and the treating conditions. Exclusive of the thinner, typical compositions may contain from 30 to 75 percent by weight of petroleum sulfonate soaps, which may be all mahogany soap, all green acid soap, or any mixture thereof; from 15 to 60 percent castor oil-modified alkyd resin; and from 5 to 15 percent of one of the "Tween" compounds. Generally from about 10 to 40 percent of the selected thinner will be employed in the final composition.

The following tabulation sets forth three specific examples of commercially employed demulsifying compounds in accordance with this invention. (Percentages by weight):

|  | 1 | 2 | 3 |
|---|---|---|---|
| Mahogany Soap | 32.5 | 22.5 | 43.0 |
| Green Acid Soap | | 10.0 | 12.0 |
| Alkyd Resin (G. E. #2555) | 32.5 | 32.5 | 10.0 |
| "Tween 80" (Polyoxyalkylene derivative or sorbitan monooleate) | 10.0 | 10.0 | 10.0 |
| Thinner (Petroleum Mineral Spirits) | 25.0 | 25.0 | 25.0 |

In practicing the process, a treating agent or demulsifying agent of the kind above described may be brought into contact with the emulsion to be treated in any of the numerous ways now employed in the treatment of petroleum emulsions with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

What I claim and desire to secure by Letters Patent is:

1. A demulsifier composition for the treatment of petroleum emulsions, comprising, a mixture of (A) petroleum sulfonate soap of the class consisting of mahogany and green acid soaps, (B) a castor oil modified alkyd resin, and (C) a compound consisting of a polyoxyalkylene derivative of a hexahydric body partially esterified with a long-chain fatty acid, the weight proportions in said mixture of A ranging from about 30 to 75 percent; of B from about 15 to 60 percent; and of C from about 5 to 15 percent.

2. A demulsifier composition in accordance with claim 1 wherein the ingredient A consists of a mixture of oil-soluble mahogany soaps and water-soluble green acid soaps in relative proportions ranging from 22.5 to 43 parts of said mahogany soaps to 10 to 12 parts of said green acid soaps.

3. A demulsifier composition in accordance with claim 1 wherein the mixture includes a quantity of an inert thinner in the proportion of from 10 to 40 per cent by weight of the product.

4. A demulsifier composition for breaking water-in-oil emulsions consisting essentially of: 30 to 75% of a petroleum sulfonate soap of the class consisting of the mahogany and green acid soaps; 15 to 60% of a castor oil modified alkyd resin of the phthalic anhydride-glycerol type; and 5 to 15% of a polyoxyalkylene derivative of a hexahydric body partially esterified with a long chain fatty acid.

5. A demulsifier composition for breaking water-in-oil emulsions consisting essentially of 30 to 75% of petroleum sulfonate soap of the class consisting of the oil-soluble mahogany and the water-soluble green acid soaps; 15 to 60% of a castor oil-modified alkyd resin of the phthalic anhydride-glycerol type; and 5 to 15% of a polyoxyalkylene derivative of sorbitan mono-oleate.

6. A demulsifier composition for breaking water-in-oil emulsions consisting essentially of oil-soluble mahogany soap 22.5 to 43%; water soluble green acid soap 10 to 12%; castor oil-modified phthalic anhydride-glycerol resin 32.5 to 10%; polyoxyalkylene derivative of sorbitan mono-oleate 5–15%; and hydrocarbon solvent 10–40%.

FRITZ EMIL FUCHS.

REFERENCES CITED

The following references are of record in the file of this patent:

UNITED STATES PATENTS

| Number | Name | Date |
|---|---|---|
| 1,872,286 | Heckel | Aug. 16, 1932 |
| 1,882,444 | Peirce et al. | Oct. 11, 1932 |
| 1,940,394 | De Groote | Dec. 19, 1933 |
| 1,978,227 | Roberts | Oct. 23, 1934 |
| 1,984,633 | De Groote | Dec. 18, 1934 |

OTHER REFERENCES

"Spans and Tweens," publication by Atlas Powder Company, page 8 (1942).